United States Patent [19]

Reynolds, Jr. et al.

[11] Patent Number: 5,201,455
[45] Date of Patent: Apr. 13, 1993

[54] METHOD FOR METALLURGICAL ENHANCEMENT OF A FAILED BOLT HOLE

[75] Inventors: Samuel D. Reynolds, Jr., Oviedo; Ashoke K. Mukherjee, Orlando, both of Fla.

[73] Assignee: Westinghouse Electric Corp., Pittsburgh, Pa.

[21] Appl. No.: 933,168

[22] Filed: Aug. 21, 1992

[51] Int. Cl.$^5$ .................................................. B23P 6/00
[52] U.S. Cl. .................................. 228/119; 29/402.07; 29/402.18
[58] Field of Search ................. 228/119; 29/402.07, 29/402.13, 102.18

[56] References Cited

U.S. PATENT DOCUMENTS

| | | | |
|---|---|---|---|
| 3,449,816 | 6/1969 | Swick et al. | 29/402.13 |
| 4,215,809 | 8/1980 | Davis | 228/119 |
| 4,953,777 | 9/1990 | Griffith et al. | 228/119 |
| 5,025,556 | 6/1991 | Stafford | 29/402.18 |
| 5,111,570 | 5/1992 | Baumgarten | 228/119 X |

Primary Examiner—Kenneth J. Ramsey

[57] ABSTRACT

A method for metallurgical enhancement of a failed bolt hole, or stud attachment, providing for replacement of service induced failed material from the female threaded area of the bolt hole. A method in accordance with the present invention is particularly suited for power plant equipment, such as a steam turbine. Failed material from the female threaded area is removed and filler metal is arc welded to the exposed base metal of the hole using a mechanized gas tungsten arc weld device employing a continuous spiral weld bead. Proper selection of the filler metal, considering the base metal to which it is applied and, moreover, the type of failure which the base metal of the hole has been experiencing, provides for improved structural integrity of the mechanical joint and increased service life of the associated steam turbine apparatus. Weld tempering of the filler metal reduces undesirable weakening of the weld metal in the heat affected zone, thus providing further metallurgical enhancement of the failed bolt hole.

16 Claims, 1 Drawing Sheet

METHOD FOR METALLURGICAL ENHANCEMENT OF A FAILED BOLT HOLE

FIELD OF THE INVENTION

This invention relates to methods for repairing a failed bolt hole, and more particularly to a method for in-situ weld repair of damaged threaded bolt holes wherein mechanically or metallurgically damaged material is removed and replaced by weld deposits with metallurgical properties which are equivalent or superior to the original base metal.

BACKGROUND OF THE INVENTION

In some circumstances, the female threaded area of a bolt hole suffers from a variety of service induced failures, which weakens the strength of the mechanical joint associated with the bolt hole. Material failure may occur in power plant equipment, such as steam turbines in the area of the steam chest, where high temperatures induce failure in the threaded areas of the bolt holes in valves made of carbon steel or low alloy chromium-molybdenum steels. Examples of steam turbine apparatus which are known to have experienced service induced failures include the bolt holes in throttle valves, governor valves, reheat stop valves, and interceptor valves. The type of failure which occurs in the mechanical joints of these valves includes creep damage, fretting corrosion, overload, and mechanically or thermally induced fatigue.

Currently known methods for replacing failed material in the female threaded area of a bolt hole require mechanical removal of the failed material from the internal diameter of the bolt hole, thus leaving a new hole in metallurgically acceptable material, but with a larger internal diameter than the preexisting hole. Subsequently, an insert is placed into the new hole. Inserts which are commonly known in the art include helicoils or mushroom studs. The insert brings the hole to its originally specified internal diameter after the insert is threaded, but does not account for the structural strength lost due to enlargement of the hole diameter and concomitant reduction in the material proximate the hole.

In turbine apparatus such as the valves discussed above, wherein a series of bolt holes are circumferentially located and spaced apart on the periphery of the mechanical joint, removal of the failed material results in removal of material from the ligaments of the joint between the bolt holes. A problem has been recognized in that the removal of material from the ligaments of the joint greatly reduces the structural strength of the joint. Placement of an insert into the bolt hole, to allow mechanical fastening by returning the hole to its original internal diameter, does not, however, return the ligament to its original strength. Thus, the overall structural strength of the joint must be sacrificed significantly in order to repair the failed material in the bolt hole. This problem is even more compounded where a plurality of adjacent bolt holes in a particular valve joint must be repaired.

Alternative methods for repairing a failed bolt hole, from a valve for example, include removing a section of the valve which encompasses the bolt hole, followed by welding an entire new section to the remaining structure and then drilling a new bolt hole. This method has been found to be undesirable as the major fabrication effort requires complete post weld heat treatment which can cause unacceptable distortion and in some cases weakens the strength of the associated joint. Another method comprises replacing the entire valve joint. The cost and complexity associated with such a method is obvious.

Therefore, there is a need for a method for replacing the failed material in the female threaded area of a bolt hole which not only retains the original structural integrity, but also provides for metallurgical enhancement of the joint in the area of the failed material. The present invention provides a method which satisfies this need.

SUMMARY OF THE INVENTION

A method for the metallurgical enhancement of a failed bolt hole in accordance with the present invention comprises the steps of removing the failed material from the female threaded area of the bolt hole and any metallurgically damaged subsurface material, selecting a welding filler metal to replace the failed material and supplying the filler metal at the bolt hole, the filler metal being metallurgically compatible with the base metal of the bolt hole, and arc welding the filler metal on the base metal. A method in accordance with the present invention is particularly suited for application to small bore bolt holes of steam turbine apparatus and other power plant equipment. As a result of the application of a method in accordance with the present invention, the metallurgical properties of the bolt hole material are enhanced and the strength of the mechanical joint associated with the bolt hole is returned to at least its strength prior to failure of the female threaded material.

DETAILED DESCRIPTION OF THE PREFERRED EMBODIMENTS

A method in accordance with the present invention for metallurgical enhancement of a failed bolt hole may be directed to bolt holes in a variety of locations throughout a steam turbine, other power plant equipment, or any other mechanical equipment with similar bolt hole distress. This method is particularly suited for application to small bore bolt holes in the mechanical joints of valves in the steam chest of a steam turbine, where high operating temperatures cause a variety of failures in the female threaded area of the bolt hole. Examples of such valves include throttle valves, governor valves, reheat stop valves, and interceptor valves. However, the present invention is not intended to be limited in this manner and a method in accordance with the present invention may be directed to bolt holes and stud attachments of mechanical joints throughout a steam turbine and other power plant equipment.

Figure 1:
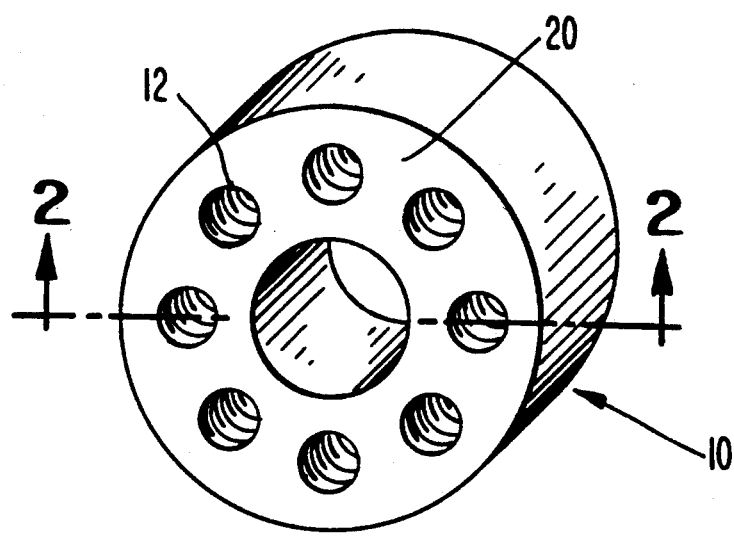
FIG. 1 is a perspective view of a typical valve of a steam turbine to which the method in accordance with the present invention may be applied.

The bolting area of a valve 10 representative of steam turbine apparatus for which a method in accordance with the present invention may be applied is shown in FIG. 1. The valve comprises mechanical joints employing threaded bolt holes 12.

Figure 2:
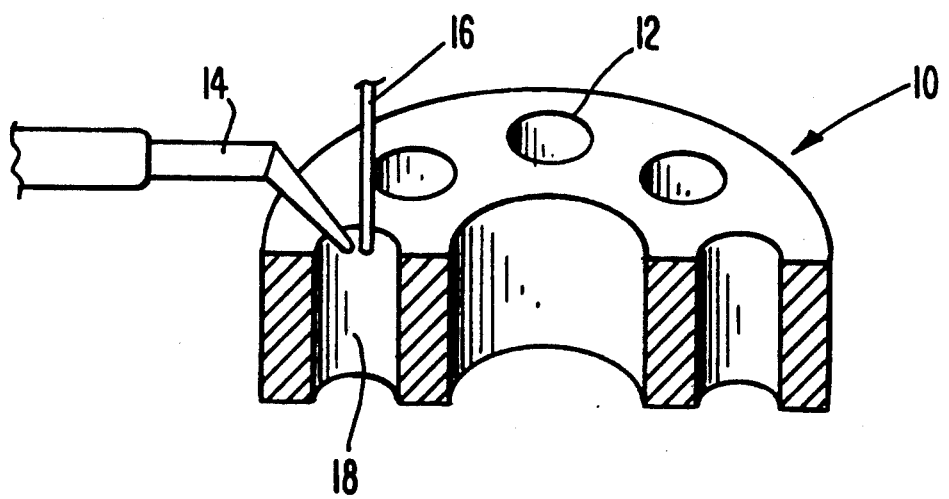
FIG. 2 is sectional view of the valve in FIG. 1, along the lines 2—2, showing application of a welding process in accordance with the present invention.

FIG. 2 shows a cross-sectional view of valve 10, wherein weld torch 14 deposits filler metal 16 on base metal 18 of bolt hole 12, as described below. In accordance with a method of the present invention, and described in detail below, failed material is removed from the female threaded area of bolt hole 12, exposing base metal 18, such that filler metal 16 may be deposited onto base metal 18 using weld torch 14.

Failed material from the female threaded area of bolt hole 12 may be removed, along with any metallurgically damaged subsurface material, resulting in an increase in the inner diameter of the hole, by reaming, drilling, or machining out the failed material, as is commonly known in the art. However, the present invention is not intended to be limited in this manner and other techniques for removing failed material from a bolt hole which are known in the art may be used. Removal of the failed material from bolt hole 12 results in a corresponding decrease in the amount of material which forms ligament width 20, thus weakening the structural strength of the mechanical joint provided by valve 10. This in turn will result in an overall decrease in performance of the steam turbine. Removal of the failed material from the female threaded area of bolt hole 12 exposes base metal 18.

In order to return the mechanical joint of valve 10 to at least its original strength prior to failure of bolt hole 12, filler metal 16 is deposited onto base metal 18 using weld torch 14. An additional amount of filler metal must be deposited so as to allow for threading of the deposited material in order to return the hole to its specified internal diameter. The welding filler metal is selected based on metallurgical compatibility with the base metal and is tailored to produce optimum metallurgical properties and service performance of the mechanical joint. For example, if the female threaded area of the bolt hole experiences failure such as high cycle fatigue or overload, a filler metal is chosen which has a higher yield strength than the base metal. If the threaded area experiences creep failure, a filler metal with improved creep rupture characteristics is selected.

Valves in the steam chest area of steam turbines are generally made of carbon steel or low alloy chromium-molybdenum (Cr—Mo) steels. Thus, examples of a base metal of a bolt hole to which a method in accordance with the present invention may be directed, include an alloy selected from the group comprising 2¼ Cr—1Mo, 1¼ Cr—½ Mo, 1¼ Cr—1Mo—V, ½ Cr—½ Mo, carbon-molybdenum steel and mild steel. In accordance with these examples, the filler metal comprises an alloy steel, the alloy steel having primary alloying elements selected from the group consisting of chromium, molybdenum, and vanadium. For example, where the base metal comprises the alloy 1¼ Cr—½Mo, in order to increase the tensile strength and creep strength properties of the female threaded area of the bolt hole, a higher alloyed filler metal, such as 2¼ Cr—1Mo, may be selected. Proper selection of the filler metal, depending upon the base metal to be welded and the type of failure which the base metal of the hole has been experiencing, provides for metallurgical enhancement of the failed bolt hole. Weld tempering techniques in accordance with the present invention, discussed below, also increase the balance of mechanical properties of the bolt holes and thus may provide for increased service life of the associated steam turbine apparatus beyond that which was originally expected.

The invention is not intended to be limited to these examples of base metals and filler metals. Accordingly, a method in accordance with the present invention may be applied to other hardenable steel alloy base metals, where the selection of the filler metal may be based on different, but optimized, filler metal chemistries. Also, the present invention may be applied to provide metallurgical enhancement of base metals comprising non-hardenable materials, where special alloy filler metals are selected to improve the mechanical and metallurgical properties of the base metal.

Following removal of the failed material from the female threaded area of bolt hole 12, welding filler metal 16 is deposited by arc welding techniques on base metal 18 using weld torch 14, as shown in FIG. 2. In a preferred embodiment of the present invention, the arc welding step is carried out using a mechanized gas tungsten arc weld device. The gas tungsten arc weld device is capable of in situ all position deposition of the filler metal in small bore holes having an internal diameter as small as 2.54 cm (1 inch), utilizing a continuous spiralling controlled overlap weld bead. Accordingly, any larger size hole can be similarly repaired.

In a preferred embodiment of the present invention, the mechanized gas tungsten arc weld device is capable of programmed synchronous pulsing parameter control. This provides for pulsing the amount of energy supplied during weld deposition of the filler metal and synchronous coordination of the wire feed system with the energy pulses. As is commonly known in the art, when welding filler metal is welded in a continuous spiralling orbital fashion, gravitational forces tend to cause the molten metal to fuse non-uniformly, thus causing unacceptable weld bead contour and potential defects. Pulsing of the weld energy obviates unacceptable weld bead shape. Synchronous coordination of the filler wire feed system provides that less filler metal is supplied to the arc during low pulse operation and more filler metal is supplied during high energy pulses in order to deposit a more uniform weld bead. In a preferred embodiment, welding filler metal 16 is supplied to the arc with a cold wire feed system.

In accordance with a method of the present invention, and described in detail below, filler metal 16 is deposited in layers onto base metal 18. Gas tungsten arc welding utilizing a continuous spiralling weld bead technique provides for deposition of an entire layer of filler metal with only one start and one stop per layer, such that the filler metal is deposited over the entire surface and length of the hole in one weld pass. Thus, the entire layer is comprised of only one pass with one start and one stop of the mechanized arc welding device. This provides for minimal distortion of the component, as compared to conventional welding methods. Conventional welding methods employ a series of overlapped single orbital beads, each bead covering the entire inner diameter surface of the hole, but only a small portion of the length of the hole, e.g. 0.32 cm (⅛ inch), and each bead having one start and one stop. Therefore, to cover, for example, 10.16 cm (4 inches) of length of a hole, a conventional method will require approximately 30 beads, with 30 starts and 30 stops. As the propensity for weld defects increases with the number of weld passes and starts and stops, a method in accordance with the present invention provides for minimal defects in the weld.

Filler metal 16 is deposited onto base metal 18 in layers. As is known in the art, during the arc welding operation, a heat affected zone (HAZ) is created wherein a portion of the base metal which has high hardenability produces a variety of metallurgical structures based on specific location cooling rates. The mass of the base metal acts as a large heat sink and thus, the combination of high hardenability and varying cooling rates alters the metallurgical properties of the base metal HAZ in an undesirable manner.

Conventional post weld heat treatment to temper the embrittled heat affected zone may be impractical and undesirable because such a treatment may cause additional thermal growth and oxidation problems and may adversely affect other components of the associated turbine apparatus. Thus, in accordance with a method of the present invention, specifically controlled welding parameters can provide self tempering effects which can obviate the need for a conventional post weld heat treatment.

Accordingly, the first layer of welding filler metal is deposited onto the base metal with relatively low arc heat input and carefully controlled overlap of weld beads. The next layers are deposited with progressively higher heat inputs. As a result, tempering effects in each previously deposited layer are controlled to provide self tempered metallurgical properties of the metal in the heat affected zone, such that, upon completion of the welding operation, post weld heat treatment becomes unnecessary. This weld bead tempering provides for enhancement of the metallurgical properties of the replacement material in the bolt hole, and the undesirable hardness and low ductility of the base metal in the heat affected zone is minimized. Also, after the last layer of filler metal has been deposited onto the base metal, the arc welding step comprises an autogenous temper pass wherein energy is applied from the arc, without the application of filler metal, so as to temper the last deposited layer of filler metal. As a result of application of a method in accordance with the present invention, the mechanical and metallurgical properties of the metal in the bolt hole or stud attachment may be better than the original base metal from which the failed female threads were produced. In turn, the tensile and/or creep strength of the associated mechanical joint may be increased and the service life of the associated steam turbine apparatus increased.

Although particular embodiments of the present invention have been described and illustrated herein, it is recognized that modifications and variations may readily occur to those skilled in the art. Consequently, it is intended that the claims be intended to cover such modifications and equivalents.

We claim:

1. A method for metallurgical enhancement of failed threaded material of a bolt hole, comprising the steps of:
   (a) removing said failed material from said bolt hole;
   (b) selecting a filler metal to replace said failed material and supplying said filler metal at said bolt hole, said filler metal metallurgically compatible with the base metal of said bolt hole; and
   (c) arc welding said filler metal on said base metal.

2. The method according to claim 1, wherein said selecting step comprises selecting a filler metal which is metallurgically compatible with said base metal, said base metal comprising an alloy selected from the group consisting of 2¼ Cr—1Mo, 1¼ Cr—½ Mo, 1¼ Cr—1Mo—V, ½ Cr—½ Mo, carbon-molybdenum steel and mild steel.

3. The method according to claim 1, wherein said selecting step comprises selecting an alloy steel, said alloy steel having primary alloying elements selected from the group consisting of chromium, molybdenum, and vanadium.

4. The method according to claim 1, wherein said filler metal selected has a higher yield strength than said base metal.

5. The method according to claim 1, Wherein said base metal comprises a hardenable steel alloy, said filler metal selected to improve the mechanical and metallurgical properties of said base metal.

6. The method according to claim 1, wherein said base metal comprises a non-hardenable material, said filler metal selected to improve the mechanical and metallurgical properties of said base metal.

7. The method according to claim 1, wherein said arc welding step comprises mechanized gas tungsten arc welding.

8. The method according to claim 7, wherein said mechanized gas tungsten arc welding provides programmed synchronous pulsing parameter control.

9. The method according to claim 1, wherein said filler metal is supplied at said bolt hole using a cold wire feed system.

10. The method according to claim 7, wherein said arc welding step comprises depositing said filler metal on said base metal in layers, each said layer deposited over the entire area of said base metal.

11. The method according to claim 10, wherein each said layer is deposited over the entire area of said base metal in one welding pass with one start and one stop.

12. The method according to claim 10, wherein said arc welding step comprises depositing said layer of said filler metal on said base metal using a continuous spiralling controlled overlap weld bead.

13. The method according to claim 10, wherein said arc welding step comprises depositing said first layer of said filler metal on said base metal with relatively low arc heat input and subsequently depositing each successive layer with progressively higher arc heat input.

14. The method according to claim 13, wherein said arc welding step further comprises an autogenous temper pass completed after the final layer of said filler metal has been deposited on said base metal.

15. In a steam turbine, a method for metallurgical enhancement of failed threaded material of a bolt hole in said steam turbine, comprising the steps of:
   (a) removing said failed material from said bolt hole;
   (b) selecting a filler metal to replace said failed material and supplying said filler metal at said bolt hole, said filler metal metallurgically compatible with the base metal of said bolt hole; and
   (c) arc welding said filler metal on said base metal.

16. In a steam turbine, said steam turbine having a valve, said valve having a plurality of bolt holes circumferentially located and spaced apart on the periphery of said valve, a method for metallurgical enhancement of failed threaded material of said plurality of bolt holes, comprising the steps of:
   (a) removing said failed material from said bolt hole;
   (b) selecting a filler metal to replace said failed material and supplying said filler metal at said bolt hole, said filler metal metallurgically compatible with the base metal of said bolt hole;
   (c) arc welding said filler metal on said base metal, said arc welding comprising mechanized gas tungsten arc welding using a continuous spiralling controlled overlap weld bead.

* * * * *